Figure 1:
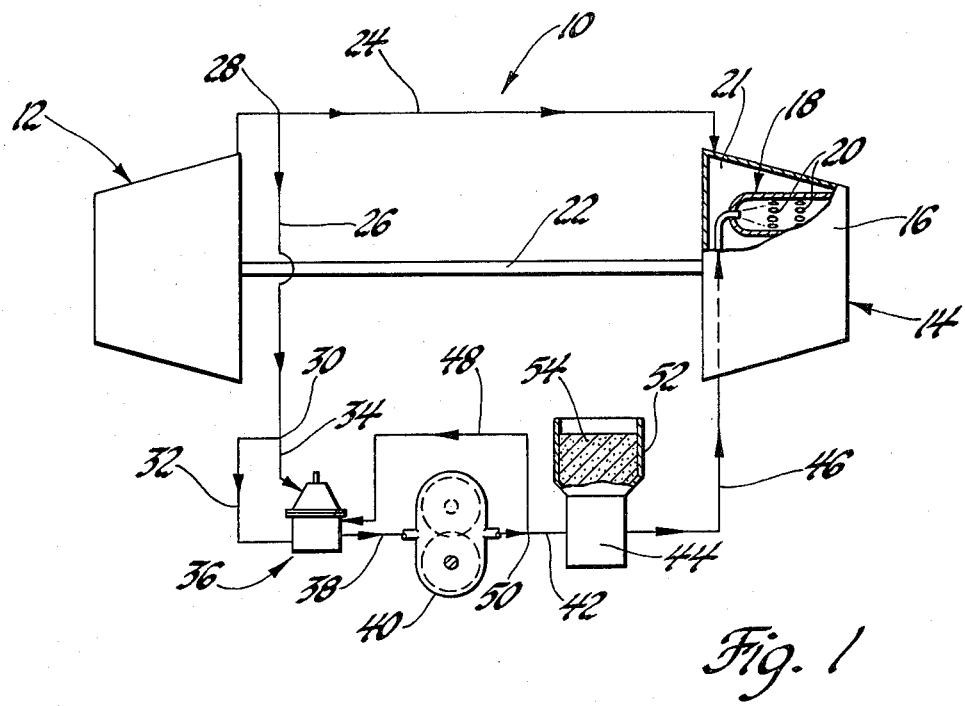

United States Patent [19]

Shows

[11] 4,392,347
[45] Jul. 12, 1983

[54] GAS TURBINE ENGINE FUEL SYSTEM
[75] Inventor: Everett W. Shows, Lake Orion, Mich.
[73] Assignee: General Motors Corporation, Detroit, Mich.
[21] Appl. No.: 287,524
[22] Filed: Jul. 27, 1981
[51] Int. Cl.³ .............................. F02C 3/26; F02C 9/20
[52] U.S. Cl. ................................. 60/39.27; 60/39.464; 417/295
[58] Field of Search ............. 60/39.46 S, 39.27, 39.29; 417/253, 295, 252; 110/106

[56] References Cited

U.S. PATENT DOCUMENTS

| | | | |
|---|---|---|---|
| 2,683,418 | 7/1954 | Smith, Jr. | 417/309 |
| 2,699,039 | 1/1955 | Yellott | 60/39.46 S |
| 2,839,253 | 6/1958 | Yellott | 60/39.46 S X |
| 3,398,526 | 8/1968 | Olah | 60/39.28 R |

*Primary Examiner*—Louis J. Casaregola
*Assistant Examiner*—Donald E. Stout
*Attorney, Agent, or Firm*—Saul Schwartz

[57] ABSTRACT

An improvement in a gas turbine engine fuel system of the type having an air pump delivering a stream of pressurized air at pump discharge pressure to a powdered coal manifold which manifold meters powdered coal into the airstream for delivery to and combustion in a combustor maintained at engine compressor discharge pressure, the improvement residing in the provision of an inlet restricting valve at the air pump inlet responsive to compressor discharge pressure and to pump discharge pressure to control the airflow inlet area to the pump so that pump discharge pressure varies directly with compressor discharge pressure and is maintained in excess of compressor discharge pressure by a constant amount sufficient to establish optimum airflow to the combustor.

3 Claims, 2 Drawing Figures

U.S. Patent

Jul. 12, 1983

4,392,347

GAS TURBINE ENGINE FUEL SYSTEM

BACKGROUND OF THE INVENTION

This invention relates generally to gas turbine engine fuel systems and, more particularly, to an improvement in systems for conveying metered quantities of powdered fuel, such as coal, to a gas turbine engine combustor maintained at an elevated pressure.

Gas turbine engines have, heretofore, been operated on solid fuels such as powdered coal. In such applications the fuel, usually stored at atmospheric pressure in a low pressure circuit of the fuel system, must be metered or otherwise transferred to a high pressure delivery circuit operative to move the fuel into the combustor against the pressure existing in the combustor. In U.S. patent application Ser. No. 184,537, filed Sept. 5, 1980 in the name of Thomas P. Kosek and assigned to the assignee of this invention, means are disclosed for metering powdered coal from low pressure storage into a stream of air flowing from an air pump into the reaction chamber of the engine's combustor. The powdered coal is entrained in the airstream and injected into the combustor for combustion. Reference may also be made to U.S. patent application Ser. No. 125,469, filed Feb. 28, 1979 in the names of Kosek and Steinhilper and assigned to the assignee of this invention, for a description of a nozzle for injecting powdered coal into the combustor. In order for the airstream to flow from the air pump to the combustor, the pressure of the stream must exceed that in the combustor. Most desirably, the airstream pressure should exceed the pressure in the combustor by an amount sufficient to effect fuel delivery but not by so much as to reduce combustion efficiency and the difference should be constant regardless of the pressure in the combustor. Accordingly, in past solid fuel delivery systems the output of the air pump has been bypassed from a point ahead of the fuel metering manifold back to the pump inlet to control delivery stream pressure. These systems are less than ideal because work must be performed to raise the pressure of the air that is eventually bypassed back to pump inlet. A gas turbine engine fuel system according to this invention represents an improvement over these and other heretofore known solid fuel delivery systems.

SUMMARY OF THE INVENTION

Figure 2:
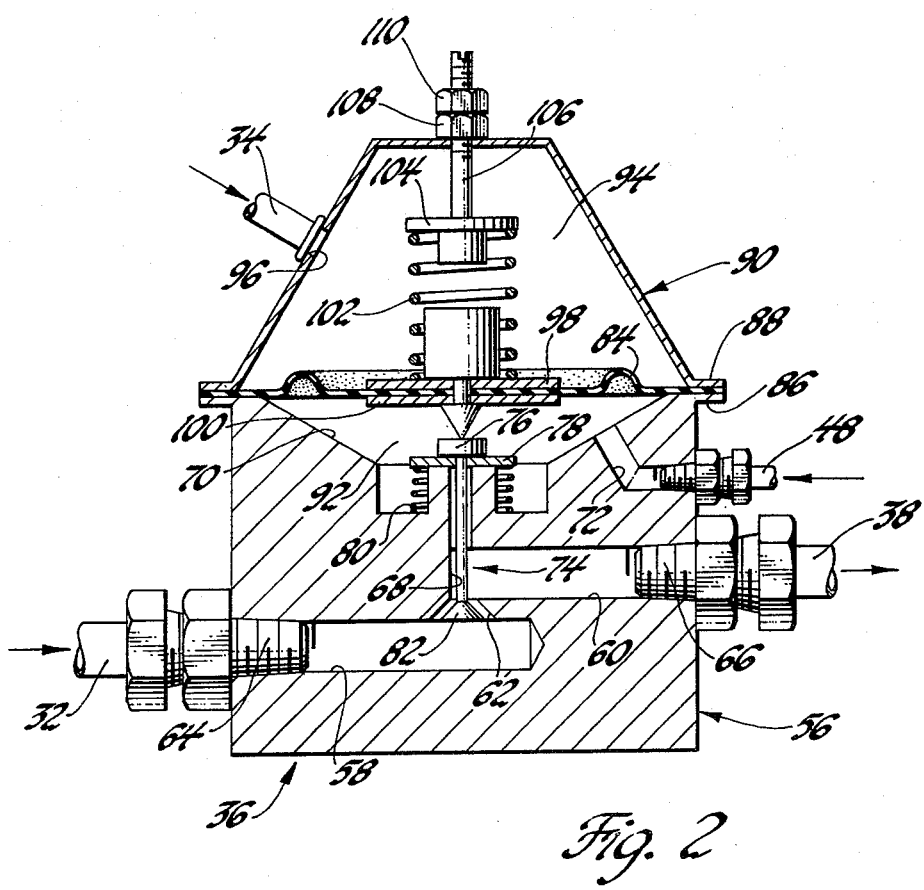

The primary feature, then, of this invention is that it provides an improved fuel system for a gas turbine engine operating on solid fuel. Another feature of this invention is that it provides an improved gas turbine engine fuel system wherein a stream of high pressure air for transporting metered quantities of solid fuel to a combustor is maintained at a pressure above combustor pressure by an air pump the discharge pressure of which is controlled by variably restricting its inlet so that no bypass of pressurized air is required, the combustor pressure being essentially equal to the compressor discharge pressure of the gas turbine engine. Still another feature of this invention resides in the provision in the improved gas turbine engine fuel system of an air pump supplied with air at gas turbine compressor discharge pressure and discharging a stream of fuel conveying air at a pressure above compressor discharge pressure and in the provision of an inlet restricting valve at the pump inlet responsive to the difference between pump discharge pressure and compressor discharge pressure to vary the restriction at the pump inlet thereby to maintain a constant difference between the pump and the compressor discharge pressure throughout the range of compressor discharge pressures incident to normal engine operation. These and other features of this invention will be readily apparent from the following specification and from the drawings wherein:

FIG. 1 is a schematic representation of an improved gas turbine engine fuel system according to this invention; and FIG. 2 is an enlarged view of a portion of FIG. 1 showing the air pump inlet restricting valve.

Referring now to FIG. 1 of the drawings a gasifier portion, designated generally 10, of a gas turbine engine is schematically illustrated and includes a compressor 12 and a gasifier turbine 14. The gasifier turbine 14 includes a housing 16, schematically illustrated, within which is situated a combustor 18 having a plurality of ports 20. The space within the housing 16 surrounding the combustor 18 defines a pressurized air plenum 21. The products of combustion developed within the combustor 18 exhaust through nozzles, not shown, and drive a gasifier turbine, also not shown, which turbine is connected by a shaft 22 to a rotor in the compressor 12. The gasifier turbine, through shaft 22, drives the rotor of compressor 12 to deliver pressurized air through a conduit 24 to plenum 21 so that the combustor 18 is completely surrounded by pressurized air at compressor discharge pressure. The ports 20 provide communication between the reaction chamber of the combustor and the plenum 21 so that the reaction chamber is also maintained at essentially compressor discharge pressure. Of course, compressor discharge pressure is a function of the rotative speed of the gasifier turbine and the compressor rotor.

With continued reference to FIG. 1, an air supply line 26 branches from conduit 24 at a tee 28 and at a tee 30, in turn, divides line 26 into a first branch line 32 and a second branch line 34. The first and second branch lines 32 and 34, as described more fully hereinafter, are connected to a pump inlet restricting valve designated generally 36. An air pump inlet line 38 extends between the valve 36 and the inlet of an air pump or secondary compressor 40. The air pump 40 is conventional in design and is driven independently of the gasifier portion 10, as for example by a secondary or power turbine in a two shaft gas turbine embodiment, at speeds always sufficient to meet or exceed air pump demand at all engine operating speeds. The pump 40 functions to raise the pressure of the air delivered through pump inlet line 38 and discharges such pressurized air through a discharge line 42 which extends between the pump and a fuel manifold 44. A fuel supply line 46 extends between the manifold 44 and the combustor 18 within the housing 16. A pump discharge pressure feedback line 48 extends between the valve 36 and a tee 50 in the pump discharge line 42.

As seen best in FIG. 1, the fuel manifold 44 has supported thereon a fuel hopper 52. The hopper 52, illustrated schematically in FIG. 1, contains a supply of coal powder 54 and is open to the atmosphere or otherwise maintained at essentially atmospheric pressure. The hopper 52 and the fuel manifold 44 cooperate in metering specific quantities of powdered coal 54 from storage at atmospheric pressure into a stream of air at pump discharge pressure passing from discharge line 42 to supply line 46. While the specific structure of the hopper and the manifold form no part of this invention, reference may be made to the aforementioned U.S. patent application Ser. No. 184,537 for a full and complete description of an operative manifold and hopper assembly.

Referring particularly now to FIG. 2, the pump inlet restricting valve 36 includes a body portion 56 having a first bore 58 therein and a second bore 60 offset from the first bore 58. The bores 58 and 60 are interconnected by a generally frustoconical throttling port 62. The first branch line 32 is threadedly attached to the body portion 56 at 64 and the pump inlet line 38 is threadedly attached to the body portion 56 at 66 so that a flow path is established between the first branch line 32 and the pump inlet line 38 through the throttling port 62.

With continued reference to FIG. 2, the body portion 56 has a bore 68 aligned with the throttling port 62 and extending into a cavity 70 of the body portion. A passage 72 extends between the cavity 70 and the exterior of the body portion 56 whereat feedback line 48 attaches to the body portion so that pump discharge pressure in the line 48 is communicated to the cavity 70. A valve element 74 is slidably mounted in the bore 68 and projects into the cavity 70. A retainer 76 on the valve element 74 retains a spring seat 78 disposed around the valve element. The seat 78 captures one end of a coil spring 80, the other end of the spring 80 being seated against the body portion 56 at the base of the cavity 70. The spring 80 resiliently biases the valve element 74 upwardly, FIG. 2, to a closed position wherein a conical head portion 82 of the valve element seats against the throttling port 62 to sever communication between the first and second bores 58 and 60.

Again referring to FIG. 2, a circular flexible diaphragm 84 is disposed over the cavity 70 and has its peripheral edge captured between a flange 86 on the body portion 56 and a corresponding flange 88 on a valve cover 90. The flanges 86 and 88 are secured together by conventional means, not shown, such that the diaphragm 84 cooperates with the cover and the body portion in defining a pump discharge pressure chamber 92 in the cavity 70 below the diaphragm 84 and a compressor discharge pressure chamber 94 in the cover 90 above the diaphragm 84. The second branch line 34 attaches to the cover 90 at a port 96 in the latter so that compressor discharge pressure in second branch line 34 is communicated to the compressor discharge pressure chamber 94.

As again best seen in FIG. 2, an annular spring seat 98 on one side of the diaphragm 84 is connected by conventional means, not shown, to an actuator plate 100 on the opposite side of the diaphragm. A coil spring 102 in the compressor discharge pressure chamber 94 seats at one end against the annular spring seat 98 and at the other end against an adjustable seat 104 carried on the end of a threaded stem 106. The stem 106 projects through the top of the cover 90 and is threadedly received in a nut 108 rigidly attached to the cover and a jam nut 110. The stem 106 is rotatable in known fashion for moving the seat 104 vertically to adjust the preload on coil spring 102 and is maintainable in any adjusted position by the jam nut 110 and the fixed nut 108.

Proceeding now to a description of the operation of the improved gas turbine engine fuel system according to this invention, when the engine and the air pump 40 are not operating the air pressure in the combustor and all of the air lines described heretofore is equal to atmospheric pressure. With no pressure differential across diaphragm 84 in valve 36, the force exerted by spring 102 exceeds the force exerted by spring 80 so that the valve element 74 is forced down to an open position, not shown, unseating head portion 82 and opening the throttling port 62. As the engine is ignited and pump 40 activated, the compressor rotor begins turning and compressor discharge pressure builds in chamber 94 on the upper surface of diaphragm 84 thus increasing the force holding valve element 74 in the open position. Simultaneously, however, the pump 40, being driven independently of the gasifier portion 10, and having increasing compressor discharge pressure at its inlet, develops increasing discharge pressure in line 42 which is fed back to chamber 92 through line 48. During the transient phase between ignition and steady state idling, compressor discharge pressure builds rapidly enough to maintain, with the help of spring 102, valve element 74 in its open position.

Assuming, now, that the fuel manifold 44 is programmed for engine idle, when the engine reaches idle speed compressor discharge pressure ceases increasing and is maintained at a level corresponding to the idle speed of the compressor rotor. However, because the air pump 40 is independently driven, pump discharge pressure in line 42 continues to increase. As pump discharge pressure increases the pressure in chamber 92 also increases and, operating against the now steady compressor discharge pressure in chamber 94, urges diaphragm 84 upward allowing spring 80 to shift valve element 74 from the open position toward the closed position wherein the head portion 82 is seated within the port 62. As the valve element approaches the closed position airflow through port 62 is progressively throttled or restricted so that the rise in pump discharge pressure diminishes until, finally, it ceases to increase at all and is maintained at a steady state level where it just balances the sum of the compressor discharge pressure force on diaphragm 84 and the force of spring 102 on diaphragm 84. When such balance is achieved, pump discharge pressure exceeds compressor discharge pressure by an amount proportional to the force exerted by spring 102. At idle, then, pump 40 delivers air at a pressure exceeding compressor discharge pressure by a predetermined amount sufficient to convey a metered quantity of powdered coal corresponding to idle speed requirements to the combustor against idle speed compressor discharge pressure.

When increased engine power is required, manifold 44 is adjusted to meter increased quantities of coal powder into the airstream in delivery line 46. Increased fuel delivery causes corresponding increase in gasifier turbine speed and, of course, in compressor rotor speed so that compressor discharge pressure begins increasing in chamber 94 and within plenum 21 and combustor 18. As compressor discharge pressure in chamber 94 builds over the idle speed pressure level, diaphragm 84 is forced down urging valve element 74 further toward its open position thus increasing airflow to the pump 40. Increased airflow at the pump inlet effects a corresponding increase in pump discharge pressure in lines 42 and 46 so that fuel is delivered to the combustor against the increasing compressor discharge pressure. Simultaneously, increasing pump discharge pessure is fed back to chamber 92 to operate on diaphragm 84 as described hereinbefore. At the steady state engine power level corresponding to the adjusted metering rate of manifold 44, the compressor discharge pressure again stabilizes and pump discharge pressure continues to increase until it just balances the force of compressor discharge pressure on diaphragm 84 and the force of spring 102 on the diaphragm so that at the higher power level the pump discharge pressure again exceeds compressor discharge pressure by the same amount, proportional to the force exerted by spring 102, as described at idle speed.

In the opposite direction of engine control when a return to idle or a decrease in engine power is desired, the fuel manifold 44 lowers the rate at which coal powder is metered from the hopper 52 into the airstream in delivery line 46 causing a decrease in gasifier turbine speed and a decrease in compressor rotor speed. Accordingly, compressor discharge pressure in lines 24, 26, and 34 and in chamber 94 decreases in proportion to the decrease in rotor speed. With lower compressor discharge pressure in chamber 94, diaphragm 84 rises under the influence of the now greater pressure in chamber 92 allowing valve element 74, under the urging of spring 80, to move upward toward the closed position causing a progressive throttling or restriction of the airflow to the pump at port 62. As pump inlet flow increases, a corresponding proportional drop in pump discharge pressure in lines 42 and 48 and in chamber 92 occurs. Pump discharge pressure continues to drop in time lag fashion with respect to compressor discharge pressure as long as compressor discharge pressure continues to decrease. When the compressor discharge pressure stabilizes at the new, lower level, the pump discharge pressure will continue falling until the force exerted by it on diaphragm 84 just balances the force exerted on diaphragm 84 by compressor discharge pressure and spring 102. Thus, again, the pump discharge pressure exceeds the new, lower compressor discharge pressure by the same amount as described hereinbefore so that the airstream in delivery line 46 continues to flow into the combustor.

As seen best in FIG. 2, the amount by which the pump discharge pressure exceeds the compressor discharge pressure during engine operation is adjustable. More particularly, the amount by which pump discharge pressure exceeds compressor discharge pressure is a function of the force exerted by spring 102. This force, in turn, is a function of the preload on the spring which depends upon the spacing between the adjustable seat 104 and the annular seat 98. This distance is variable by rotation of the stem 106, such rotation causing the adjustable seat to move up or down relative to fixed nut 108 depending on the direction of rotation. Once a desired adjusted position is achieved, the jam nut 110 cooperates with the nut 108 in well known manner to lock the stem against rotation thereby maintaining the adjusted position of the seat 104.

The embodiments of the invention in which an exclusive property or privilege is claimed are defined as follows:

1. In a gas turbine engine having an operating range between idle and full power and including a combustor, a compressor adapted to supply pressurized air at a variable compressor discharge pressure proportional to engine power to said combustor for fuel combustion within said combustor, a fuel supply apparatus operative to supply a metered quantity of powdered combustible fuel, and nozzle means at said combustor for dispersing a mixture of said powdered fuel and air into said combustor for combustion therein, the improvement comprising, an air pump driven independently of said compressor having an inlet and a discharge wherefrom a stream of air is provided at a pump discharge pressure proportional to pump inlet flow area, means connecting said pump discharge to said nozzle means so that said airstream is dispersed by said nozzle means into said combustor, means connecting said fuel supply apparatus to said pump discharge so that said metered quantity of powdered fuel is entrained in said airstream at said pump discharge pressure and delivered thereby to said nozzle means for dispersal into said combustor, inlet restricting valve means at said pump inlet operative to restrict pump inlet flow area thereby to control said pump discharge pressure, and control means connected to said valve means responsive to said compressor discharge pressure and to said pump discharge pressure to operate said valve means so that said pump discharge pressure varies directly with said compressor discharge pressure and is maintained in excess of said compressor discharge pressure by a constant preselected amount in at least a portion of the operating range of said gas turbine engine.

2. In a gas turbine engine having an operating range between idle and full power and including a combustor, a compressor adapted to supply pressurized air at a variable compressor discharge pressure proportional to engine power to said combustor for fuel combustion within said combustor, a fuel supply apparatus operative to supply a metered quantity of powdered coal, and nozzle means at said combustor for dispensing a mixture of said powdered coal and air into said combustor for combustion therein, the improvement comprising, an air pump driven independently of said compressor having an inlet and a discharge wherefrom a stream of air is provided at a pump discharge pressure proportional to pump inlet flow area, means connecting said pump discharge to said nozzle means so that said airstream is dispersed by said nozzle means into said combustor, means connecting said fuel supply apparatus to said pump discharge so that said metered quantity of powdered coal is entrained in said airstream at said pump discharge pressure and delivered thereby to said nozzle means for dispersal into said combustor, inlet restricting valve means at said pump inlet operative to restrict said inlet flow area thereby to control said pump discharge pressure, and control means connected to said valve means including a diaphragm exposed on one side to said compressor discharge pressure and on the other side to said pump discharge pressure and a spring engaging said diaphragm on said one side and biasing said diaphragm with said compressor discharge pressure, said diaphragm being responsive to said compressor discharge pressure and to said pump discharge pressure to operate said valve means to vary said pump discharge pressure directly with said compressor discharge pressure and said spring providing a bias in addition to said compressor discharge pressure operative to maintain said pump discharge pressure in excess of said compressor discharge pressure by a preselected amount.

3. In a gas turbine engine having an operating range between idle and full power and including a combustor, a compressor adapted to supply pressurized air at a variable compressor discharge pressure proportional to engine power to said combustor for fuel combustion within said combustor, a fuel supply apparatus operative to supply a metered quantity of powdered coal, and nozzle means at said combustor for dispersing a mixture of powdered coal and air into said combustor for combustion therein, the improvement comprising, an air pump driven independently of said compressor having an inlet and a discharge wherefrom a stream of air is provided at a pump discharge pressure proportional to pump inlet flow area, means connecting said pump discharge to said nozzle means so that said airstream is dispersed by said nozzle means into said combustor, means connecting said fuel supply apparatus to said pump discharge so that said metered quantity of powdered coal is entrained in said airstream at said pump discharge pressure and delivered thereby to said nozzle means for dispersal into said combustor, an inlet restricting valve having a passsage therethrough including a throttling port, means connecting an inlet end of said passage to said compressor for delivery to said inlet end of pressurized air, means connecting an outlet end of said passage to said air pump inlet so that pressurized air from said compressor is delivered through said throttling port to said air pump inlet, a valve element disposed in said throttling port and biased to a closed position interrupting airflow through said passage at said throttling port and a plurality of open positions progressively increasing the flow area through said throttling thereby to control the inlet flow area to said air pump and said pump discharge pressure, a diaphragm on said inlet restricting valve having one side exposed to said compressor discharge pressure and the other side exposed to said pump discharge pressure, a spring disposed between said inlet restricting valve and said one side of said diaphragm biasing said diaphragm with said compressor discharge pressure, and connecting means between said diaphragm and said valve element operative to move said valve element between said closed position and respective ones of said open positions in response to movement of said diaphragm, said diaphragm being responsive to said compressor discharge pressure and to said pump discharge pressure to selectively position said valve element in respective ones of said open positions so that said pump discharge pressure varies directly with said compressor discharge pressure and said spring providing a bias in addition to said compressor discharge pressure operative to maintain said pump discharge pressure in excess of said compressor discharge pressure by a preselected amount.

* * * * *